Dec. 23, 1930.  W. G. WILSON  1,785,924
MECHANICAL LOCK AND LOCKING METHOD
Filed Dec. 18, 1928    2 Sheets-Sheet 1
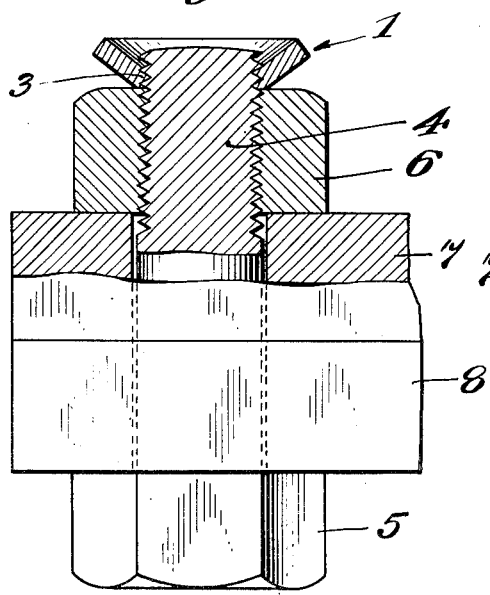
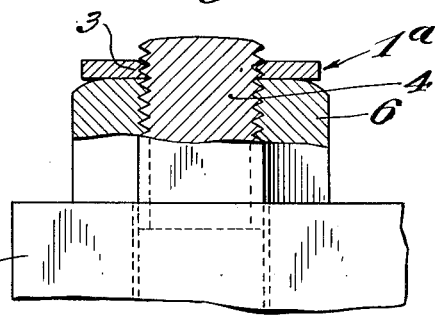
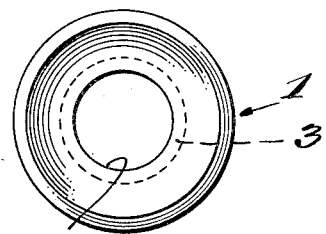
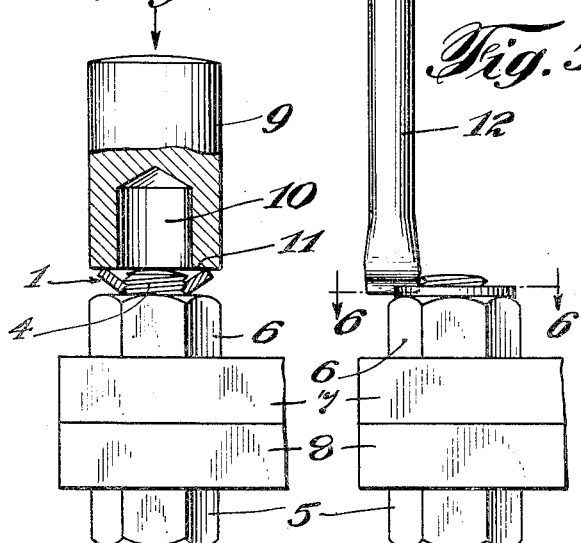
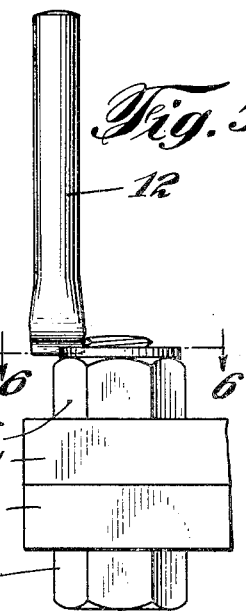
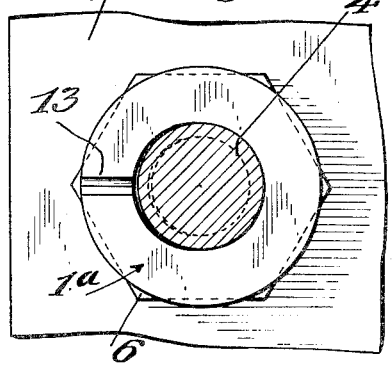
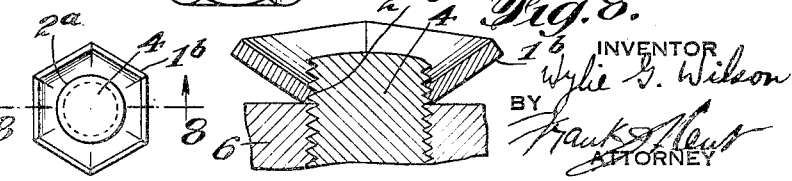
INVENTOR
Wylie G. Wilson
BY
Frank S. Nevis
ATTORNEY

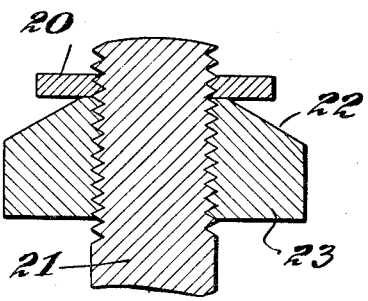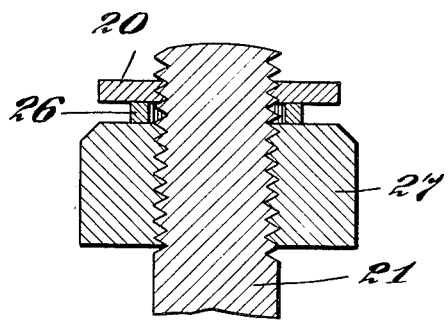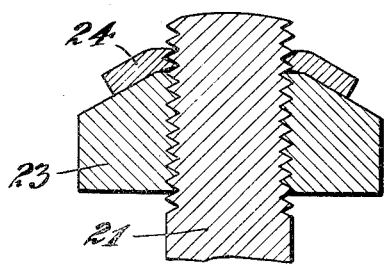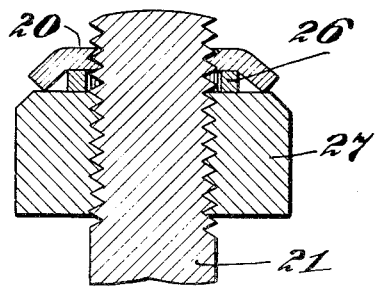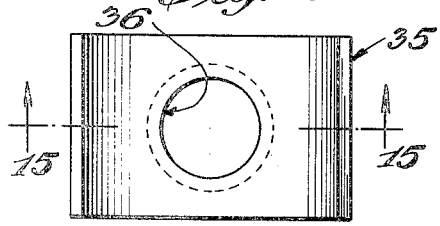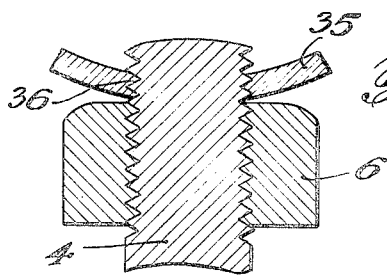

Patented Dec. 23, 1930

1,785,924

UNITED STATES PATENT OFFICE

WYLIE G. WILSON, OF ELIZABETH, NEW JERSEY, ASSIGNOR TO WILSON RINGS COMPANY, OF JERSEY CITY, NEW JERSEY, A CORPORATION OF NEW JERSEY

MECHANICAL LOCK AND LOCKING METHOD

Application filed December 18, 1928. Serial No. 326,795.

My invention relates to locking devices, of the class commonly called "nut-locks."

The general object is to provide a locking structure or device of great simplicity and low cost, which is easily and quickly applied, and thereupon has an exceptionally positive and strong locking action, superior to that of any device known to me which has any comparable features of simplicity, low cost, or ease of application.

When employed as a nut-lock, a further important object is to provide a locking device having the characteristics just stated, and which in addition requires no change in common bolt-and-nut structures, or methods of applying nuts to bolts, but may be applied to the bolt after the nut is tightened, and then clinched by distortion, to secure the locking device to the bolt, and prevent loosening of the nut.

In its broadest aspect, the invention structure consists of (I) a plate or disc-like member inserted or secured by distortion in an annular aperture, seat or socket of a body, or (II) a plate or disc having an aperture receiving a body, on which the aperture-wall is clamped by distortion of the plate. The general form (I) is covered by another application; the present application is confined, in its specific showing and description, to general form (II), with some claims of breadth to cover either form.

As to form II as here disclosed, the invention comprises a deformable disc or plate having a central hole, and a body within the hole; the plate being deformed in such manner that the hole wall is powerfully contracted, to secure the plate to the body.

The plate or disc may be originally flat, and distorted to curved, cupped, conical, or conoidal form; or originally in curved, cupped, conical or conoidal form, and deformed by partially or completely flattening it.

In one general application or embodiment, the invention structure comprises a conically deformable disc or plate of substantial thickness and having a central hole, and preferably devoid of other openings or weakening formations; and a body within the hole; the plate being subjected to what I call "conical deformation," by which the hole wall, or an edge thereof is powerfully constricted to secure the plate to the body.

In adapting this fundamental structure as a nut lock, the body above mentioned is a threaded bolt, and the locking disc or washer is applied at the exposed face of a nut tightened thereon, so that the active function of the washer is to prevent loosening of the nut; the latter also acts as an abutment for the deformation of the washer by application of a suitable implement thereto.

By "conical deformation" I mean the deformation of an annular disc by change in its cone-angle, this being in the broadest sense in such manner as to either increase or decrease the "conicity" of the disc; thus the disc might be originally flat, and distorted to conical form, with accompanying powerful contraction of its hole; or, and preferably in most cases, for present purposes, it may be originally in conical form, and distorted in the direction of "flattening," or preferably completely flattened, with accompanying powerful constriction of the hole wall, or at least some portion thereof.

For this purpose the locking disc may be threaded, and when applied, positively prevents loosening of the nut by any force short of destruction of the disc.

Other general forms are hereafter described, including flat plates or discs which are distorted to conical form, or other curved formations, and curved or cupped plates (other than conical) which are clinched by deformation toward, or to, flat form.

The characteristics and advantages of the invention are further sufficiently explained in connection with the following detail description of the accompanying drawing, which shows certain exemplifying embodiments. After considering these examples, skilled persons will understand that many variations may be made, and I contemplate the employment of any structures that are properly within the scope of the appended claims.

In the drawing:

Fig. 1 is a part-sectional, side elevation, of a structure embodying the invention in one form, the locking disc being in applied, but not secured condition.

Fig. 2 shows the disc in secured (flattened) or locked condition.

Fig. 3 is a top plan of one form of lock washer, in original (unflattened) form.

Fig. 4 explains the method of securing the fastening device.

Fig. 5 explains the method of removing the fastening device to free the nut.

Fig. 6 is a top plan of Fig. 5.

Fig. 7 is a top plan of a modified disc, or locking device.

Fig. 8 is a sectional view, showing the same applied to a bolt and nut, but not secured.

Figs. 9 and 10 are sectional views of another structure, also explaining another method of effecting locking.

Figs. 11 and 12 are similar views of still another structure and method.

Fig. 13 is a section of another modification.

Fig. 14 is a top plan of another modification.

Fig. 15 is a section at 15—15, Fig. 14.

Figs. 1 and 3 show one suitable plate, disc, or locking device, 1 in original (undistorted) form. It may be of any suitable metal, steel being preferred in many cases, but other metals are also suitable, either for nut locking, or when the prime object is merely to secure the plate on a body inserted therein. The disc is of substantial thickness, and the thickness is also preferably approximately uniform, or entirely so; although variations in thickness are permissible in some cases. The disc has a central aperture 2, which is round, as shown, to cooperate with a round object, such as the bolt presently referred to. Variation in contour of the opening is permissible, to cooperate with other than strictly round objects. The disc is formed as a cone, or conical annulus, and the cone-angle may vary considerably. Such an angle as approximately 45°, as shown is satisfactory.

As shown in Figs. 1 and 2, the disc is applied by screwing it down on the threaded end 4 of a bolt 5, against the outer face of a nut 6 thereon, the nut being previously tightened to secure the bolt in one or more bodies such as 7, 8 and hold such bodies together.

A suitable deforming (or clinching) tool such as the "set," or die 9, Fig. 4, is then applied to the disc. The die has an end opening 10 to accommodate the bolt end, and a flat annular end face 11 to engage the disc, which is flattened down upon the nut face by hammer blows upon the die, the flattened or locked disc being designated 1ª in Fig. 2.

The radial width of the disc (from aperture wall to periphery) is substantial, and sufficient to prevent rupture and to strongly resist the flattening action, which tends to enlarge the disc diameter; thus while as shown in Fig. 2, the clinched disc has a slightly greater over-all diameter than that of the area subtended by the conical disc in Fig. 1, the act of flattening produces a powerful constrictive force, tending to substantially reduce the diameter of the aperture 2, and to clamp the aperture wall with great pressure upon the bolt surface, and this pressure is maintained during the life of the clamped structure. During the flattening action, the lower edge of the aperture wall tends to move in farther than the upper edge, and greater gripping force is therefore probably exerted upon the bolt at points near the nut face, than at points farther therefrom.

The nut is thus permanently locked upon the bolt, and cannot be loosened by other than destructive force, except when it is desired to loosen or remove it; this is accomplished by use of a suitable tool, such as a cold chisel 12, Fig. 5; when a cold chisel is used, the disc is split and spread as indicated at 13, Fig. 6, so that when the disc is removed, and the nut loosened by use of a wrench, the nut may be run off of the bolt as easily as when it was applied; that is, the use of a threaded locking disc prevents or avoids any injury to the bolt thread.

Figs. 7 and 8 show a permissible variation. The conical disc 1ᵇ, Fig. 8, has a polygonal (instead of circular) peripheral outline, which would provide for more conveniently or powerfully screwing the disc down upon a threaded bolt.

It is an important characteristic of the invention, in the forms so far described, that the disc shall have a substantial radial width (distance in a radial line from aperture wall to peripheral wall) at different points in a circumferential direction, and shall be free from radial slots or other weakening formations, which, while they would materially reduce resistance to the flattening action, would at the same time greatly reduce the constrictive effect, and force of clamping action. In particular the disc is to be free from wrinkles, such as would be formed by bending the body, extending to the aperture.

Fig. 9 shows an internally threaded flat locking disc 20 applied to a bolt 21 against the conical outer face 22 of a special nut 23. The disc is clinched by deformation to conical form, 24 (Fig. 10) against the conical face of the nut, which acts as an abutment for this operation, by application of a suitable tool to the disc. In this deformation, the aperture wall of the disc, and especially the lower part thereof, is powerfully contracted, and tightly grips the bolt.

Fig. 11 shows a similar locking disc 20, with a narrow washer, or fulcrum ring 26, placed about the bolt 21, between the disc and any ordinary nut 27. The disc is deformed to conical shape (Fig. 12) by pressure applied by an annular tool to outer portions of the disc, thus causing it, by central resistance of the fulcrum ring, to bend to conical form, and grip the bolt by contraction of the aperture wall, or lower portion thereof.

Various other modes of effecting conical deformation of a flat disc, for the purpose in view, may be employed, as comprehended in the broader claims.

It should be understood that the fulcrum line, or line of bend of the disc during the distorting movement, should be close to the threaded bolt, and that Figs. 9 to 12 show the fulcrum line at an exaggerated distance from the bolt.

Fig. 13 shows a locking disc 30, which is of annularly cupped, or double conical form, as sufficiently explained in the drawing. This is clinched by flattening.

Figs. 14 and 15 show an embodiment radically different from the forms previously described, but within the broad limits of the invention. The locking plate 35 is in this example of rectangular outline, and of arcuate curvature, and is clinched by flattening it against nut 6, whereupon the aperture 36 is constricted principally, or entirely, in the general direction of the section line 15—15, Fig. 14.

It is now evident that the use of my plate or disc devices as nut locks, except as shown in Figures 9 and 10, dispenses with any special formation of the bolt or nut, or with any "washer" or analogous device inserted "under" the nut; and that the nut may be applied to and screwed down on the bolt in the ordinary way, directly against the body in which the bolt is located, and the locking plate is then applied and distorted by simple means, and thereafter secures the nut as effectively as other more complicated devices, including those which have positive interlocking engagement with the nut, or bolt, or both.

It will be understood that Figs. 1, 8, 13, 14 and 15, considered generically, are examples of a locking plate which is originally of dished, curved, cupped, conical, or conoidal form, and is clinched by reducing its curvature, or by flattening; and that Figs. 9 to 12 broadly considered are examples of a plate which is originally flat, and is distorted to curved, conical, or other cupped form. Evidently each specific form may be varied in ways suggested in other examples; thus, any of the plates may have a polygonal outline (Figs. 8, 9, 14 and 15) or smoothly curved or round outline (Figs. 1, 3, 9 to 12 and 13); also in the case of generally conical plates (Figs. 1, etc.) the sectional form need not be that of a true cone, but may be conoidal, or "cupped". Evidently, also, specific variations are too numerous to mention, and are sufficiently comprehended in the preceding description and scope of the following claims.

I claim:

1. A clamping member comprising a deformable washer-like body formed with an aperture, the lower edge of the aperture lying in a single plane, the wall of the aperture being cut with screw threads for cooperation with the screw threads of a bolt, the member being adapted to be clamped on the bolt by deforming part of the body in a direction parallel to the axis of the bolt, thereby constricting the aperture and causing the member to grip the bolt.

2. A clamping member comprising a deformable body formed with an aperture, the body being free from wrinkles extending to the aperture, the wall of the aperture being cut with screw threads for cooperation with the screw threads of a bolt, the member being adapted to be clamped on the bolt by deforming part of the body in a direction parallel to the axis of the bolt, thereby constricting the aperture and causing the member to grip the bolt.

3. A clamping member comprising a deformable body in the shape of a frustum of a cone with a central aperture and with its walls free from wrinkles extending towards the aperture, the wall of the aperture being cut with screw threads for cooperation with the screw threads of a bolt, the member being adapted to be clamped on the bolt by flattening the body to thereby constrict the aperture and cause the member to grip the bolt.

4. A clamping member comprising a deformable body in the shape of a frustum of a cone with a central aperture and with its wall free from wrinkles extending to the aperture, the wall of the aperture being cut with screw threads for cooperation with the screw threads of a bolt, the member being adapted to be clamped on the bolt by flattening the body to thereby constrict the aperture and cause the member to grip the bolt.

5. A clamping member comprising a deformable body formed with a central aperture, the material of the body adjacent the aperture being in the form of a frustum of a cone so shaped that if cross-sections are taken on a succession of planes above the threaded aperture and parallel to the base of the frustum, each cross-section will form a circle, the wall of the aperture being cut with screw threads for cooperation with the screw threads of a bolt, the member being adapted to be clamped on the bolt by flattening the body to thereby constrict the aperture and cause the member to grip the bolt.

6. A clamping member comprising a deformable body formed with an aperture, the body adjacent the aperture being free from corrugations formed by bending the body into radial ridges, the wall of the aperture being cut with screw threads for cooperation with the screw threads of a bolt, the member being adapted to be clamped on the bolt by applying pressure to the outer periphery of the member in a direction parallel to the axis of the bolt, to deform the body, thereby constricting the aperture and causing the member to grip the bolt.

7. A clamping member comprising a deformable washer-like body formed with an aperture, the lower edge of the aperture lying in a single plane, the wall of the aperture being cut with screw threads for cooperation with the screw threads of a bolt and the member in cross-section extending upwardly from the edges of the aperture and then downwardly to the outer edges of the member, the member being adapted to be clamped on the bolt by deforming part of the body in a direction parallel to the axis of the bolt, thereby constricting the aperture and causing the member to grip the bolt.

8. A clamping member comprising a deformable body formed with an aperture, the body being free from wrinkles extending to the aperture, the wall of the aperture being cut with screw threads for cooperation with the screw threads of a bolt, the member initially having upper and lower cylindrical surfaces and being adapted to be clamped on the bolt by deforming part of the body in a direction parallel to the axis of the bolt, thereby constricting the aperture and causing the member to grip the bolt.

In testimony whereof I affix my signature.

WYLIE G. WILSON.